United States Patent
Griesmeier et al.

(10) Patent No.: US 6,670,060 B2
(45) Date of Patent: Dec. 30, 2003

(54) FUEL CELL SYSTEM

(75) Inventors: Uwe Griesmeier, Markdorf (DE);
Dietmar Mirsch, Kirchheim (DE);
Wolfgang Schmid, Ulm (DE); Alfred
Haug, Kirchheim (DE); Klaus Dobler,
Nuertingen (DE)

(73) Assignee: Ballard Power Systems AG,
Kirchheim/Teck-Nabern (DE)

( * ) Notice: Subject to any disclaimer, the term of this patent is extended or adjusted under 35 U.S.C. 154(b) by 89 days.

(21) Appl. No.: 09/839,607

(22) Filed: Apr. 23, 2001

(65) Prior Publication Data

US 2002/0004153 A1 Jan. 10, 2002

(30) Foreign Application Priority Data

Apr. 22, 2000 (DE) .......................................... 100 20 087

(51) Int. Cl.$^7$ ................................................ H01M 8/18
(52) U.S. Cl. ........................ 429/19; 429/34; 429/38
(58) Field of Search .............................. 429/34, 38, 39, 429/17, 13, 19, 9; 180/65.3, 68.5

(56) References Cited

U.S. PATENT DOCUMENTS 5,193,635 A * 3/1993 Mizuno et al. ............ 180/65.3
6,202,710 B1 * 3/2001 Dill et al. .................... 141/94

* cited by examiner

*Primary Examiner*—Patrick Ryan
*Assistant Examiner*—R Alejandro
(74) *Attorney, Agent, or Firm*—Crowell & Moring LLP

(57) ABSTRACT

A fuel cell system has a single-stage or multistage gas generation unit for producing a hydrogen-rich gas from an untreated fuel, a single-stage or multistage gas cleaning unit, at least one fuel cell and a single-stage or multistage exhaust-gas treatment unit for converting the fuel cell exhaust gases as completely as possible. At least two sub-units of the fuel cell system are connected to one another mechanically and in terms of flow by means of a connecting plate.

13 Claims, 2 Drawing Sheets

FUEL CELL SYSTEM

BACKGROUND AND SUMMARY OF THE INVENTION

This application claims the priority of German patent document 100 20 087.7, filed Apr. 22, 2000, the disclosure of which is expressly incorporated by reference herein.

The present invention relates to a compact fuel cell system.

The fuel used in conventional fuel cells is hydrogen, which is produced from a liquid fuel, for example from methanol, in stages connected upstream of the fuel cell. Since the production of hydrogen usually also involves the formation of carbon monoxide, which is damaging to the fuel cell, a gas cleaning unit is additionally incorporated, so that the anode side of the fuel cell is exposed to substantially pure hydrogen. If a liquid fuel is used as the starting material, an evaporator unit is often also provided. Finally, to avoid environmental pollution, an exhaust-gas treatment unit is provided, in which all the combustible constituents of the fuel cell exhaust gases are converted as completely as possible. To construct an overall system which is able to function, all these components have to be connected to one another, both mechanically, and in terms of flow.

It is an object of the invention to provide a compact fuel cell system which is suitable for mechanical installation.

This and other objects and advantages are achieved by the fuel cell system according to the invention, having a single-stage or multistage gas generation unit for producing a hydrogen-rich gas from an untreated fuel, having a single-stage or multistage gas cleaning unit, at least one fuel cell and a single-stage or multistage exhaust-gas treatment unit for converting the fuel cell exhaust gases as completely as possible. At least two sub-units of the fuel cell system are connected to one another mechanically and in terms of flow by means of a connecting plate.

A considerable advantage of this arrangement is that, compared to conventional, sometimes highly complex arrangements of pipes, this arrangement is very compact and clear. There is no longer any risk of connecting lines being incorrectly connected. A further significant advantage is that this structure is suitable for mechanical installation and can therefore advantageously be used for automated production in relatively large numbers.

Furthermore, it is easy to exchange or replace individual sub-units, for example in the event of a defect. A final advantage is that the control technology as well as measurement and metering points can be integrated.

A further problem of fuel cell systems is that individual sub-units operate at highly divergent temperatures. In the fuel cell system according to the invention, it is easy to thermally isolate the sub-units by selecting a suitable material for the connecting plate 10. If, in the first exemplary embodiment, the connecting plate is of very rigid design, it is also possible to reduce problems caused by vibrations.

Other objects, advantages and novel features of the present invention will become apparent from the following detailed description of the invention when considered in conjunction with the accompanying drawings.

DETAILED DESCRIPTION OF THE DRAWINGS

Figure 1:
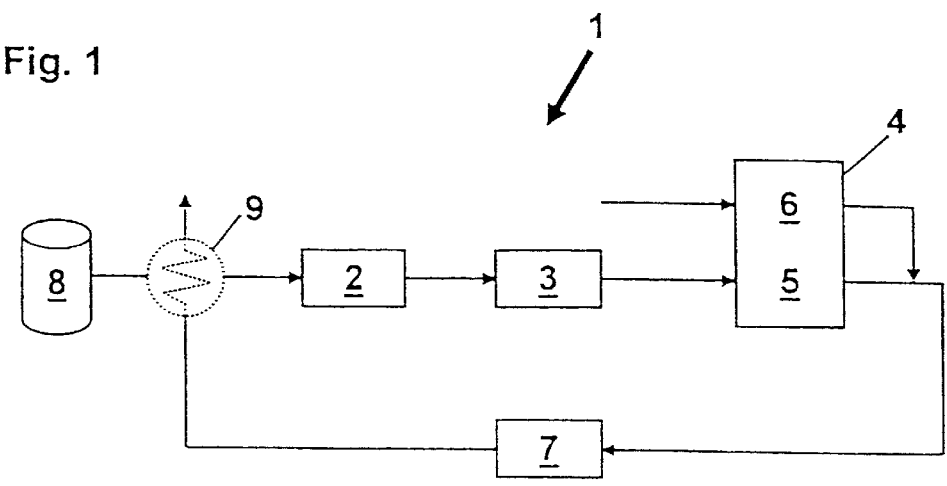
FIG. 1 shows a simplified block diagram of a fuel cell system.

The fuel cell system shown in FIG. 1, denoted overall by reference numeral 1, has a gas generation unit 2, a gas cleaning unit 3, a fuel cell 4 with an anode space 5 and a cathode space 6, and an exhaust-gas treatment unit 7. In the gas generation unit 2, a hydrogen-rich gas is generated from a fuel by means of partial oxidation and/or steam reforming. This hydrogen-rich gas usually also contains carbon monoxide, which is damaging to the catalysts which are present in the anode space 5 of the fuel cell 4. For this reason, a gas cleaning unit 3 is provided between the gas generation unit 2 and the anode space 5 of the fuel cell 4. The cleaning unit is preferably a device for the selective catalytic oxidation of the carbon monoxide with oxygen being added; however, it is also possible to use other suitable gas cleaning units 3, for example a membrane cleaning unit.

After it has flowed through the fuel cell 4, the anode exhaust gas is mixed with the outgoing air from the cathode space 6 and this mixture is fed to the exhaust-gas treatment unit 7, where all the combustible constituents of the fuel cell exhaust gases are converted as completely as possible at a suitable catalyst, preferably a precious metal catalyst. As an alternative to the cathode exhaust gas, it is also possible for a different oxygen-containing gas to be admixed with the anode exhaust gas upstream of the exhaust-gas treatment unit 7.

The fuel is fed from a fuel tank 8 into the gas generation unit 2. Liquid fuels are preferably carried in the fuel tank 8. However, it is also possible to use gaseous fuels; in the latter case the fuel tank 8 is designed as a pressurized-gas or liquefied-gas store. If a liquid fuel is used, it is customary to also provide an evaporator unit 9 which converts the liquid fuel into the gaseous phase before it enters the gas generation unit 2. In the exemplary embodiment shown, the evaporator unit 9 is heated by the hot exhaust gases from the exhaust-gas treatment unit 7. As an alternative, however, it is also possible for the evaporator to be heated by a different heat transfer medium. It is also possible for the exhaust-gas treatment unit 7 to be completely or partially integrated into the evaporator unit 9.

Numerous fuel cell systems of this type are known from the prior art, and therefore the systems have not been described in detail above. The scope of protection is not intended to be restricted by the nature and structure of a fuel cell system of this type.

Figure 2:
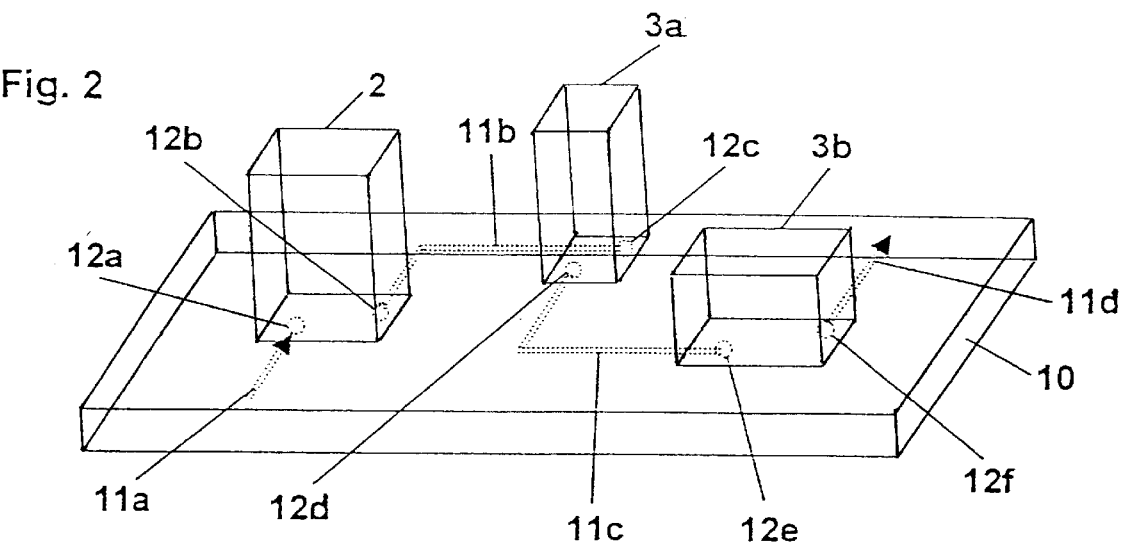
FIG. 2 shows a first embodiment of a fuel cell system according to the invention.
Figure 3:
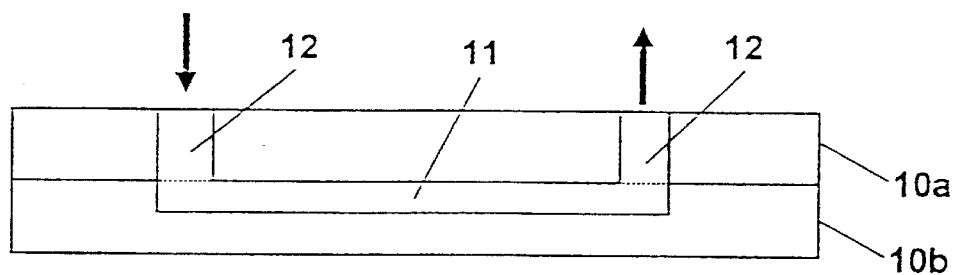
FIG. 3 shows a partial section through a connecting plate according to the invention.

In a first exemplary embodiment of the invention shown in FIGS. 2 and 3, various sub-units of the fuel cell system are connected to one another in terms of flow and mechanically by means of a connecting plate 10, in a similar manner to a printed circuit board used in the semiconductor industry. In this exemplary embodiment, by way of example three sub-units are integrated on the connecting plate 10. These sub-units may, for example, be a gas generation unit 2 and a two stage gas cleaning unit 3a, 3b. The mechanical connection of the sub-units to the connecting plate 10 not shown in the drawing, in order to simplify the latter. However, the sub-units are preferably screwed to the connecting plate 10, preferably with seals (which are likewise not shown) being interposed. In this case, it is readily possible for individual sub-units to be exchanged easily and quickly, for example in the event of a defect. Naturally, it is also possible for the sub-units to be connected to the connecting plate 10 in other ways, for example by adhesive bonding, welding, soldering, riveting, etc.

Each of the individual sub-units has at least one inlet and outlet for the hydrogen-rich gas. However, it is also possible to provide other or further media inlets and outlets, for example for an oxygen-containing gas or a heat-transfer medium. However, these further media inlets and outlets are not shown in the drawing, in order to simplify the latter. Flow channels 11 FIG. 3, which preferably extend in the direction of the principal plane of the connecting plate 10, are provided in the connecting plate 10. These flow channels 11 are in communication, substantially at right angles to the principal plane of the connecting plate 10, with the corresponding media inlets and outlets of the sub-units, via bores 12 (FIG. 3).

Therefore, in accordance with the exemplary embodiment shown, a preferably gaseous fuel and, if appropriate, steam and/or oxygen are supplied via the flow channel 11a. The connection of the flow channel 11a to the fuel tank 8 and/or the evaporator unit 9 is not shown. The fuel is then passed through the bore 12a into the gas generation unit 2. (Once again, the corresponding media inlet of the gas generation unit is again not specifically illustrated.) After it has flowed through the gas generation unit 2, the hydrogen-rich gas is then passed into the flow channel 11b via a media outlet, which once again is not specifically shown, and the bore 12b. The way in which the media are guided within the gas generation unit 2, or all the sub-units, is of little consequence to the invention and is therefore not illustrated at any point. The only important factor is that the media inlets and outlets of the sub-units correspond with the associated bores 12.

The hydrogen-rich gas is then fed via the flow channel 11b to the gas cleaning unit 3a through the bore 12c and, after it has flowed through this gas cleaning unit 3a, is discharged again into the flow channel 11c via the bore 12d. The flow channel 11c guides the partially cleaned gas into the second stage 3b of the gas cleaning unit with the aid of the bore 12e. After it has flowed through this second stage 3b, the fully cleaned gas is then passed into the flow channel 11d via the bore 12f and is preferably guided to the fuel cell 4 (not shown).

In the exemplary embodiment illustrated, all the sub-units are arranged on one surface of the connecting plate 10. Naturally, it is also possible for some or all of the sub-units to be arranged on the opposite surface of the connecting plate 10.

In a preferred example for the structure of a connecting plate according to the invention as shown in FIG. 3, the connecting plate 10 comprises two partial plates 10a and 10b. To form the flow channels 11, a recess 11 is formed on that surface of the partial plate 10b which faces the other partial plate 10a. When the two partial plates are joined together, the recess 11 in the partial plate 10b together with the other partial plate 10a forms the flow channel 11. Moreover, bores 12 are provided in the partial plate 10a, for connection of the sub-components. In this connection, the term bore is used in the sense of any desired aperture in the partial plate 10a, irrespective of its cross section or the way in which it is made. In addition to the exemplary embodiment shown, it is also possible for corresponding recesses 11 to be provided in that surface of the partial plate 10a which faces the partial plate 10b, instead of or in addition to the recesses in the partial plate 10b. If sub-units are also arranged on the partial plate 10b, corresponding bores 12 also have to be provided in the partial plate 10b. Instead of two partial plates 10a, 10b it is also possible to use a greater number of partial plates, making it possible to produce a more complex system of flow channels, for example including flow channels which cross one another, in a simple manner.

Furthermore, it is also possible for the connecting plates 10 to be produced in other ways, for example by injection moulding, by deep-drawing of metal sheets or in other suitable ways. It is also conceivable for flow channels to be formed in a single-piece connecting plate by means of a plurality of bores, in which case bore parts which are not required are then closed again.

The arrangement of a gas generation unit 2 and a two-stage gas cleaning unit 3a, 3b on a connecting plate 10 merely represents one exemplary embodiment. Naturally, the teaching according to the invention relating to the connection of sub-units of a fuel cell system, both mechanically and in terms of flow, can also be applied to other combinations of sub-units. Furthermore, the sub-units used may also be so-called combined reactors. In combined reactors of this type, two or more reactors have already been integrated thermally and possibly also in terms of flow. By way of example, combined reactors are known for the integration of a gas generation unit 2 and a gas cleaning unit 3 or for the integration of an exhaust-gas treatment unit 7 in an evaporator unit 9. In combination reactors of this type, it may likewise be necessary to provide a relatively large number of media inlets and outlets.

Figure 4:
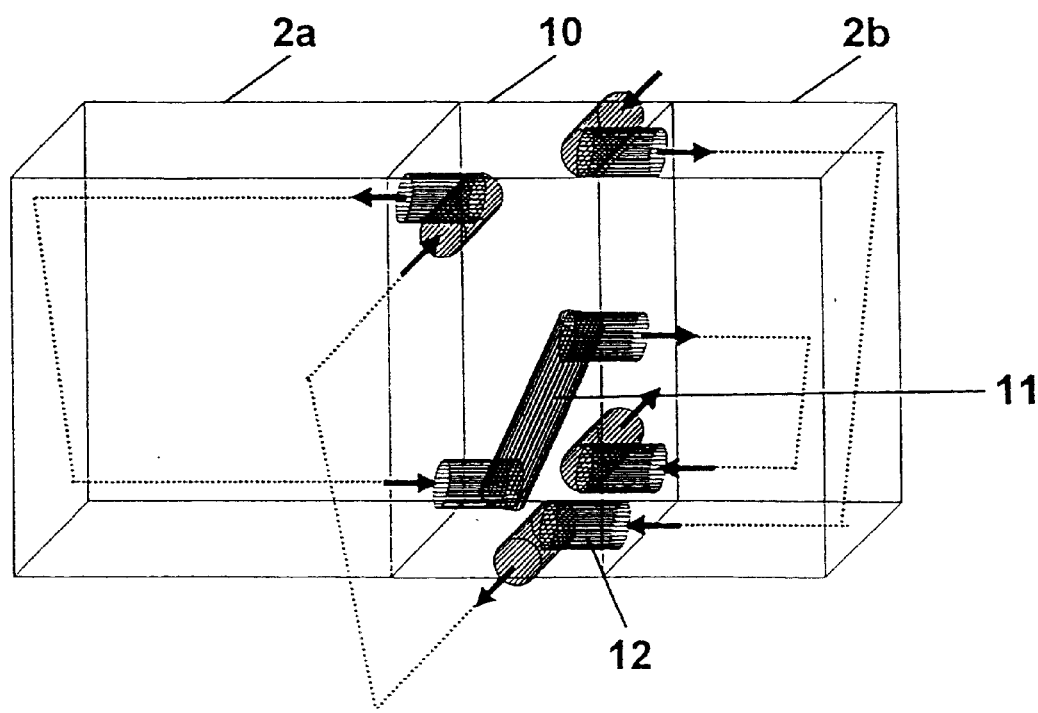
FIG. 4 shows an outline view of a second embodiment of the fuel cell system according to the invention.

In a second exemplary embodiment illustrated in FIG. 4, the connecting plate 10 is arranged exactly between the end faces of two sub-units, for example two stages 2a, 2b of a gas generation unit. In this case, all the media inlets and outlets of the sub-units are also arranged in their end faces. After the sub-units 2a, 2b have in each case been mechanically connected to the connecting plate 10, the result is a body which overall is mechanically stable. Of course, this type of connection can be used not only to connect two sub-units but also a plurality of sub-units in series with one another, in which case a connecting plate 10 is provided between each pair of sub-units. Furthermore, it is possible for two or more sub-units to be connected in this way a number of times and for these combined units then to be connected either conventionally, by means of external piping, or in the manner illustrated in FIGS. 2 and 3.

If the media inlets and outlets of the two opposite sub-units 2a, 2b in each case lie opposite one another, it is sufficient to provide one bore 12. If the associated media inlets and outlets do not lie opposite one another, the media are diverted appropriately by a combination of bores 12 and flow channels 11. In this case too, it is possible for the connecting plate 10 to be produced from two or more partial plates, so that in this case too it is possible to produce complex flow distributions in a simple manner. If the connecting plate 10 is of sufficient thickness in the direction perpendicular to its principal plane, it is also possible to arrange one or more further sub-units or also a media inlet or outlet on the side faces of the connecting plate 10, resulting overall in a type of star-shaped arrangement.

A considerable advantage of this arrangement is that it is easy to integrate measurement and metering points in the connecting plate 10. Furthermore, compared to conventional, in some cases highly complex arrangements of piping, this arrangement is very compact and clear. There is also no longer any risk of connecting lines being incorrectly connected. A further significant advantage is that this structure is suitable for machine assembly and can therefore advantageously be used for automated production in relatively large numbers.

Furthermore, it is easy to exchange individual sub-units, for example in the event of a defect. A final advantage is that the control engineering and measuring and metering points can be integrated.

A further problem of fuel cell systems is that individual sub-units operate at highly divergent temperature levels. In the system according to the invention, however, it is easy to thermally isolate the sub-units by selecting suitable materials for the connecting plate 10. If, in the first exemplary embodiment, the connecting plate is of very rigid design, it is moreover possible to reduce problems with vibrations. With very rigid connecting plates, it is also possible to connect the sub-units in a self-supporting manner to the connecting plate 10, to form a composite unit, so that the composite unit can easily be attached, for example, to a frame part of a vehicle by means of a device arranged on the connecting plate 10.

If the way in which the media are guided requires the media to flow through sub-units—preferably combination reactors—not just once, but rather that the flow of media be diverted after it has flowed through the sub-unit and then be guided back into the sub-unit, a connecting plate may also be installed as an end plate of a single sub-unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system, comprising:
   a single-stage or multistage gas generation unit for producing a hydrogen-rich gas from an untreated fuel;
   a single-stage or multistage gas cleaning unit for removing carbon monoxide from the hydrogen-rich gas;
   at least one fuel cell unit; and
   a single-stage or multistage exhaust-gas treatment unit for converting the fuel cell exhaust gases; wherein
     at least two units of the fuel cell system are connected to one another mechanically and in terms of flow by means of a connecting plate;
     the connecting plate is formed with opposite sides thereof parallel to a principal plane;
     at least one flow channel is provided in the connecting plate, which flow channel runs substantially parallel to the principal plane;
     the units are arranged on one side or on opposite sides of the connecting plate; and
     the units are in flow communication with the at least one flow channel via bores arranged substantially perpendicular to the principal plane.

2. The fuel cell system according to claim 1, wherein:
   the connecting plate is formed from at least two partial plates;
   recesses for forming the flow channels are provided in at least one of mutually facing surfaces of adjacent partial plates; and
   bores, which run substantially perpendicular to the plane, are provided in at least one partial plate for connecting the units to the flow channels or for providing flow communication between two flow channels.

3. The fuel cell system according to claim 2, wherein the partial plates are in the form of deep-drawn metal sheets.

4. The fuel cell system according to claim 1, wherein:
   the connecting plate is rigid;
   the at least two units are connectable to the connecting plate in a self-supporting manner to form a composite structure; and
   the connecting plate has a device for attaching the composite structure to a frame part of a vehicle.

5. A fuel cell system, comprising:
   a single-stage or multistage gas generation unit for producing a hydrogen-rich gas from an untreated fuel;
   a single-stage or multistage gas cleaning unit for removing carbon monoxide from the hydrogen-rich gas;
   at least one fuel cell unit; and
   a single-stage or multistage exhaust-gas treatment unit for converting the fuel cell exhaust gases; wherein
     at least two units of the fuel cell system are connected to one another mechanically and in terms of flow by means of a connecting plate;
     the connecting plate is arranged between the at least two units; and
     at least one flow channel, which is arranged substantially parallel to the principal plane or the bores which are arranged substantially perpendicular to the principal plane for providing flow communication between the at least two units, are provided in the connecting plate, and the at least two units are in each case mechanically connected to the connecting plate.

6. The fuel cell system according to claim 5, wherein at least one further sub-unit is connected to the connecting plate mechanically and in terms of flow, perpendicular to an axis formed by the two sub-units.

7. A fuel cell system, comprising:
   a single-stage or multistage gas generation unit for producing a hydrogen-rich gas from an untreated fuel;
   a single-stage or multistage gas cleaning unit for removing carbon monoxide from the hydrogen-rich gas;
   at least one fuel cell unit; and
   a single-stage or multistage exhaust-gas treatment unit for converting the fuel cell exhaust gases; wherein
     at least two units of the fuel cell system are connected to one another mechanically and in terms of flow by means of a connecting plate; and
     said connecting plate has integrated therein fluid flow connections between said at least two units.

8. The fuel cell system according to claim 7, wherein:
   the connecting plate is formed with opposite sides thereof parallel to a principal plane;
   at least one flow channel is provided in the connecting plate, which flow channel runs substantially parallel to the principal plane;
   the units are arranged on one side or on opposite sides of the connecting plate;
   the units are in flow communication with the at least one flow channel via bores arranged substantially perpendicular to the principal plane.

9. The fuel cell system according to claim 8, wherein:
   the connecting plate is formed from at least two partial plates;
   recesses for forming the flow channels are provided in at least one of mutually facing surfaces of adjacent partial plates; and
   bores, which run substantially perpendicular to the principal plane, are provided in at least one partial plate for connecting the units to the flow channels or for providing flow communication between two flow channels.

10. The fuel cell system according to claim 9, wherein the partial plates are in the form of deep-drawn metal sheets.

11. Fuel cell system according to claim 8, wherein:

the connecting plate is arranged between the at least two units;

at least one flow channel, which is arranged substantially parallel to the principal plane or the bores which are arranged substantially perpendicular to the principal plane for providing flow communication between the at least two units, are provided in the connecting plate, and the at least two units are in each case mechanically connected to the connecting plate.

12. The fuel cell system according to claim 11, wherein at least one further sub-unit is connected to the connecting plate mechanically and in terms of flow, perpendicular to an axis formed by the two sub-units.

13. The fuel cell system according to claim 7, wherein:

the connecting plate is rigid;

the at least two units are connectable to the connecting plate in a self-supporting manner to form a composite structure; and the connecting plate has a device for attaching the composite structure to a frame part of a vehicle.

* * * * *